June 2, 1959

F. BAUMANN 2,889,197

METHOD OF REMOVING CARBON DIOXIDE AND
HYDROGEN SULPHIDE FROM GASES

Filed May 17, 1955

INVENTOR
FRIEDRICH BAUMANN

FIG. 2

INVENTOR
FRIEDRICH BAUMANN

FIG. 3

INVENTOR
FRIEDRICH BAUMANN

June 2, 1959

F. BAUMANN 2,889,197

METHOD OF REMOVING CARBON DIOXIDE AND
HYDROGEN SULPHIDE FROM GASES

Filed May 17, 1955

INVENTOR
FRIEDRICH BAUMANN

June 2, 1959 F. BAUMANN 2,889,197
METHOD OF REMOVING CARBON DIOXIDE AND
HYDROGEN SULPHIDE FROM GASES
Filed May 17, 1955 5 Sheets-Sheet 5

FIG. 5

INVENTOR
FRIEDRICH BAUMANN

United States Patent Office 2,889,197
Patented June 2, 1959

2,889,197
METHOD OF REMOVING CARBON DIOXIDE AND HYDROGEN SULPHIDE FROM GASES

Friedrich Baumann, Leuna, Kreis Merseburg, Germany

Application May 17, 1955, Serial No. 509,075

8 Claims. (Cl. 23—50)

The present invention relates to a method and a device for removing valuable components from gases, and more particularly to a method and a device for removing carbon dioxide and/or hydrogen sulphide from gases containing the same.

It is an object of the present invention to prevent the loss of other valuable components of the gas.

It is another object of the invention to conduct the washing of the gases so as to obtain final products which are valuable from a technical point of view.

It is a further object of the invention to obtain from the gas reaction products which are technically usable.

It is still another object of the invention to increase the capacity of the device.

It is a still further object of the present invention to improve the energy balance and to decrease the costs of the method.

It is still another object of the present invention to avoid losses in hydrogen and/or carbon oxide.

Other objects and advantages of the invention will become apparent from the following detailed description thereof in connection with the accompanying drawings showing, by way of example, some embodiments of a device according to the invention.

It has been found that carbon dioxide and/or hydrogen sulphide may be removed from gases containing same by contacting the gases with solutions containing substances having an alkaline reaction, particularly ammonia and hydroxides of alkali metals, such as, for example, sodium hydroxide or potassium hydroxide, and in addition with salts which react in double conversion with the carbon dioxide of the gases and the alkali (ammonia), whereby reaction products are obtained which are sparingly soluble or deposited as crystals. The residual solution is used for separately dissolving fresh charges of salt so that particularly the perpetual evaporation is avoided and only occasionally residual solutions have to be worked up.

If, for instance, sodium nitrate is added to an aqueous solution of synthetic ammonia, and if with the so obtained mixture a synthetic gas consisting for instance preponderantly of hydrogen, carbon monoxide, nitrogen, and carbon dioxide is washed, ammonium nitrate and sodium bicarbonate are formed according to the equation:

Both these reaction products are technically valuable. The sparingly soluble sodium bicarbonate may be used as such or converted by calcining into soda whereas the ammonium nitrate to be obtained from the remaining solution by crystallization, is a commerical fertilizer being much in demand.

In an analogous manner soda and ammonium chloride (salammoniac) may be obtained from natural inexpensive brine or crude salt (sodium chloride).

Other usable salts, are for example, sodium sulphate, sodium phosphate, calcium chloride, calcium sulphate, calcium biphosphate, barium nitrate, barium chloride, etc.

For removing the hydrogen sulphide, are to be considered the salts of zinc, nickel, copper, and other metals as far as they form a sparingly soluble or insoluble sulphide, for reasons of economy, however, particularly the salts of iron.

All these compositions have the common property that in the course of a cleaning process carried out without losses, synthetic gases produced on a large scale from valueless and undesirable carbon dioxide and an inexpensive and low-grade salt and ammonia which has to be worked in any case to obtain final products therefrom, technically desirable reaction products are obtained. Thus large possibilities result for the application of the new process.

Besides the mentioned advantages the new method involves great economical advantages in large scale industrial plants. A water gas produced from brown coal or lignite and intended for a synthesis of gasoline, alcohol, or ammonia under high pressure, contains for instance about 25% carbon dioxide. Thus a quarter and more of the quantity of gas has to be carried along as ballast through all stages of operation (removal of sulphur, conversion of carbon oxide, operation of compressors) up to the separation of carbon dioxide by means of water under pressure. However, if desired, the separation of carbon dioxide according to the new process may immediately start after the production of the gas. This amounts to an increase in capacity of 25% for all plants up to the cleaning by pressurized water. Of course, a gain in energy, in cooling water, and in expenses caused by the compression is connected therewith. Particularly, however, the avoidance of losses in hydrogen and carbon oxide is very important because the washing with pressurized water may be omitted.

In general the gases used for the synthesis of ammonia, gasoline, or alcohols contain about 2 to 20 grams of hydrogen sulphide per cubic meter and a low content (about 100 to 300 milligrams per cubic meter) of organic sulphur. Preferably the hydrogen sulphide is removed before the carbon dioxide washing. This is performed best by treating the gas in washing towers or in saturators in which a liquid is circulated which contains ammonia and a salt reacting in a double reaction with the ammonium sulphide formed from the ammonia and the hydrogen sulphide, the metal ion contained in the salt combining with the sulphur ion to form a sparingly soluble compound and a fertilizer being formed by the ammonia with the anion of the salt. For instance The iron sulphate added to the washing liquid is converted into iron sulphide and may as such easily be separated from the solution by filtration, suction, or the like. To the washing liquid containing ammonium sulphate is added again iron sulphate so that eventually the ammonium sulphate is concentrated in the liquid. This liquid having a strong concentration of ammonium sulphate is now cooled in order to crystallize out the ammonium sulphate which is then reentered into the process. However, the liquid may be evaporated and worked for the ammonium sulphate being now in the solid state. The iron sulphide may be, if desired, roasted or decomposed with acids, the sulphur being obtained either as sulphur dioxide, hydrogen sulphide, or else directly as sulphur, according to the employed process.

For the practical carrying out of the process for purifying the carbon dioxide the following stages have to be differentiated:

(1) The linkage of the carbon dioxide with ammonia.

(2) The precipitation of the bound carbon dioxide from the previously formed bicarbonate of ammonia with the salt (for instance sodium nitrate, sodium chloride, etc.).

(3) The separation of the formed sodium bicarbonate by means of filters, suction devices, precipitation tanks, or centrifuges.

(4) The separation of the generated salt of ammonia after a sufficient concentration thereof either in the circulating liquid by cooling, or by concentrating the exhausted liquid.

(5) Resaturation of the circulating liquid with the salt and returning the liquid into the circulation of the plant.

(6) Ammonia is absorbed by the synthetic gases during the operation of the plant. By connecting an additional washing apparatus the ammonia is removed from the synthetic gases by means of diluted salt solutions or condensates.

(7) The last remanants of ammonia in the gas are eliminated by means of an acidic washing.

(8) Finally the gas may be washed with water in order to remove therefrom any acid droplets.

(9) The treatment of the generated products, viz. sodium bicarbonate and the ammonium salt, is carried out is a manner known per se in the art.

Figure 1:
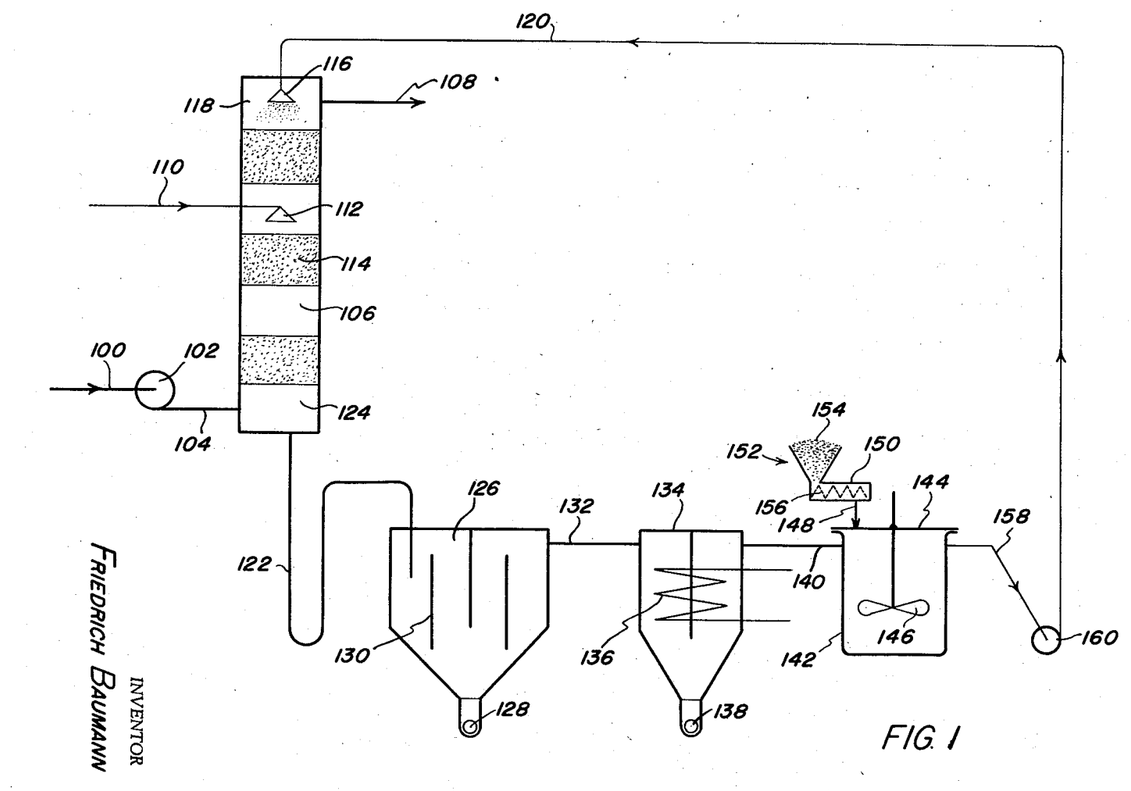
Fig. 1 is a diagram or flow sheet of a device according to the invention intended for separating hydrogen sulphide from a gas.

Referring now to the drawings and first to Fig. 1 a device for carrying out the process according to the invention is shown. The synthetic gas enters through a pipe 100 and is imparted the required pressure by a fan or blower 102. The fan 102 supplies the synthetic gas at an increased pressure to a pipe 104 which enters a wash column or tower 106 near the lower end thereof; the gas leaves the same through a pipe 108 arranged at the upper end of the wash column 106. In the washing tower a circulation of a washing fluid or lye is maintained in the following manner:

An aqueous solution of ammonia flows through a pipe 110 entering the washing column 106 in the upper part thereof, the pipe 110 being provided with a spraying device 112 which sprays gaseous ammonium hydroxide or a solution of ammonia on one of the filtering insets 114 arranged one above the other at regular distances in the column 106. A spraying device 116 is arranged in the uppermost compartment 118 of the column 106. The spraying device 116 is connected to a pipe 120 forming part of a closed circuit for the washing fluid presently to be described. The washing fluid leaving the spraying device 116 passes through the filtering insets such as 114 and is mixed with the aqueous solution of ammonia entering through the pipe 110 and the spraying device 112. The washing fluid after passing the washing column 106 enters a siphon 122 communicating with the lowest compartment 124 of the column 106. The siphon 122 ends in a container 126 provided with a discharging device 128 arranged in the bottom part thereof. The washing fluid contains a salt such as iron sulphide, part of which is deposited in solid form at the bottom of the tank 126 and transported from the same by the discharging device 128. The washing fluid passes the compartments defined by walls such as 130 of the container 126 so as to be cleared thereby and leaves the container 126 through a pipe 132 connecting it with a vessel 134 in which the washing fluid is cooled by means of the cooling device 136 formed by a pipe through which a flow of a cooling agent is maintained. In the vessel 134 part of the dissolved salt is precipitated from the washing fluid as ammonium salt such as ammonium sulphate which is deposited in the lower portion of vessel 134 and removed therefrom by a discharging device 138. The washing fluid freed from ammonia sulphate is transported through a connecting pipe 140 to a container 142 covered by a cover 144 carrying a stirring device 146 driven by an electric motor (not shown) or the like. Furthermore, the cover 144 is connected with a pipe 148 connected in turn to the horizontal part 150 of a casing generally denoted by 152 and having a funnel-shaped part 154 communicating with the horizontal part 150 in which a conveying screw 156 is arranged. The conveying screw 156 is driven in suitable manner such as by an electric motor (not shown). The charged salt such as iron sulphate delivered in solid form to the funnel-shaped part 154 is transported by the conveying screw 156 to the pipe 148 from which it is delivered to the container 142 in which it is dissolved by the washing fluid under the action of the stirring device 146. The washing fluid provided with a fresh charge of the salt leaves the container 142 through a pipe 158 and enters the casing of the pumping device 160 which is connected to the pipe 120 connected with the spraying device 116.

The operation of this device is as follows:

The synthetic gas to be freed from hydrogen sulphide entering through the pipe 100 passes the fan or blower 102 imparting to the synthetic gas the required pressure, and enters through the pipe 104 the lowest compartment 124 of the washing column or tower 106 in which it ascends and passes the filtering insets such as 114. The synthetic gas is freed of hydrogen sulphide and leaves the column or tower 106 through the pipe 108 connected to the uppermost compartment 118 thereof.

While ascending through the column 106 the synthetic gas reacts with the gaseous ammonium hydroxide or the solution of ammonia sprayed by the spraying device 112 on the filtering inset 114. The ammonia is combined with the washing fluid entering the column 106 through the spraying device 116 arranged in the uppermost compartment 118. The washing fluid leaves the column 106 through the siphon 122 connected to the container 126 in which part of the charging salt such as iron sulphide is separated in solid form from the washing fluid and deposited at the bottom of the tank or container 126 from which it is transported by the discharging device 128. The washing fluid enters then the vessel 134 and is cooled therein by the cooling agent circulating in the cooling device 136 so that part of the dissolved salt is precipitated as ammonium sulphate which is discharged from the vessel 134 by the discharging device 138. After this the washing fluid enters the container 142 where it dissolves under the action of the stirring device 146 the solid iron sulphate delivered by the conveying screw 156. After passing through the container 142 the washing fluid is pumped by the pumping device 160 into the pipe 120 connected with the spraying device 116 arranged in the uppermost compartment 118 of the washing column or tower 106.

Figure 2:
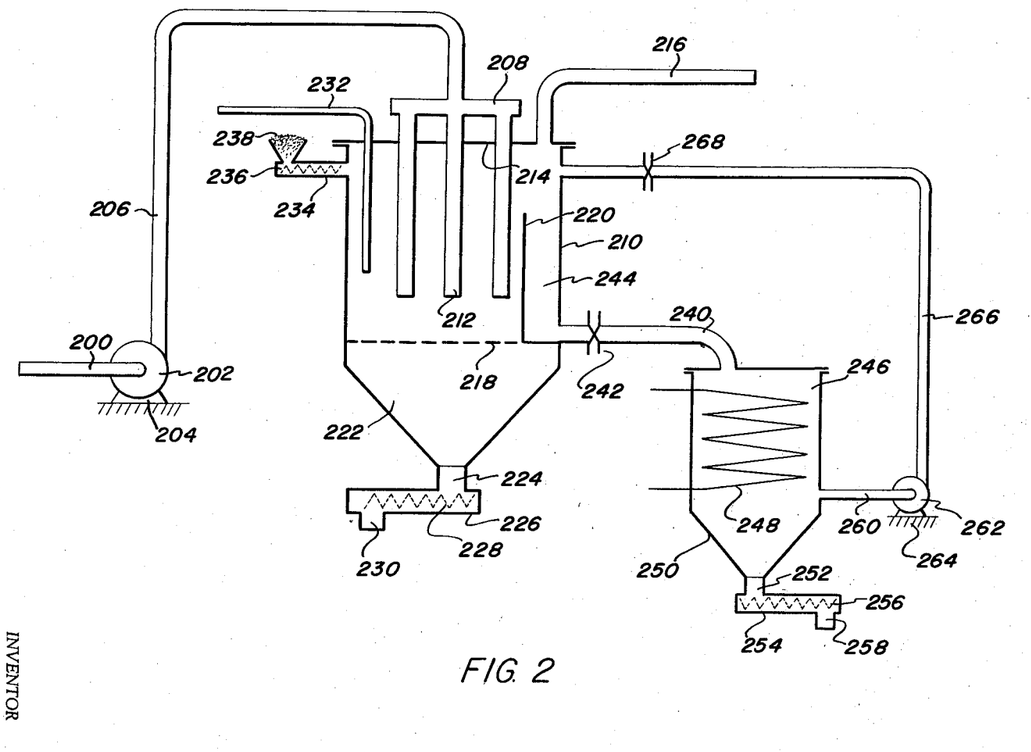
Fig. 2 is a diagram of a modified device for separating hydrogen sulphide from a gas.

Referring now to Fig. 2 of the drawings a simplified device for freeing a synthetic gas from hydrogen sulphide is shown. The synthetic gas enters through a pipe 200 and is imparted the necessary pressure by a blower or fan 202 resting on a stationary support 204. The fan 202 is connected with a pipe 206 leading to a distributing head 208 arranged above a vessel 210 and communicating with three or more pipes such as 212 connected with the distributing head 208 and reaching downwards from the same into the vessel 210. The cover 214 of the vessel 210 through which the pipes 212 pass is connected with a pipe 216 for the synthetic gas. A sieve bottom 218 is provided in the vessel 210 and carries a partition 220. The lower part 222 of the vessel 210 is conically shaped and provided at the lower end with an opening 224 communicating with a casing 226 for a conveying screw 228 conveying the solid material deposited from the liquid filling the vessel 210 and delivering the same to a discharge opening 230. An inlet pipe 232 for ammonia or an aqueous solution thereof is arranged in the upper part of the vessel 210 close to the cover 214. Furthermore, a casing 234 for a conveying screw 236 conveying the charging salt charged into a hopper 238 is provided in the uppermost portion of the vessel 210. An outflow pipe 240 provided with a valve 242 leads from the lower portion of a chamber 244 of the vessel 210 directly above the sieve bottom 218, the chamber 244 being defined in the vessel 210 by the partition 220 mentioned hereinabove. The outflow pipe 240 leads to a vessel 246 provided with a cooling device 248. The lower part 250 of the vessel 246 is conically shaped and connected by an outflow 252 with the casing 254 of a conveying screw 256 conveying the solid material consisting of ammonia salt to a discharge opening 258. The vessel 246 is provided in the lower part of the cylindrical portion thereof with an outflow pipe 260 leading to a pump 262 resting on a stationary support 264 and conveying the liquid to a pipe 266 provided with a valve 268 and connected with the upper part of the vessel 210.

The operation of the device shown in Fig. 2 is as follows:

The synthetic gas entering through the pipe 200 is brought to the required pressure by the blower 202 delivering the gas to the pipe 206 connected to the distributing head piece 208 from which the gas is delivered through the pipes such as 212 to a fluid or liquid in the vessel 210. After reacting with the fluid or liquid present in the vessel 210 the gases are discharged through the pipe 216.

Ammonia either as a gas or as an aqueous solution enters the vessel 210 by the pipe 232. At the same time the charging salt such as iron sulphate is delivered to the hopper 238 and transported by the conveying screw 236 into the upper portion of a liquid filling the vessel 210. The sieve bottom 218 serves for holding back larger pieces of the solid material such as iron sulphate. The conveying screw 228 arranged in the casing 226 at the lower end of the vessel 210 serves for removing the formed sulphide (iron sulphide). The washing fluid is then transported to the vessel 246 in which after a sufficient cooling by the cooler 248 and concentration of the ammonium salt the latter is separated in solid form from the liquid and removed by the conveying screw 256 and the discharging opening 258. The remaining liquid is conveyed by the pump 262 into the pipe 266 from which the liquid reenters the vessel 210 in which it is enriched by further additions of the salt such as iron sulphate and ammonia so that the process is repeated. A removal of the ammonia from the synthetic gas is not required since the synthetic gas has to be free from ammonia only after the carbon dioxide has been removed therefrom since the gas is used later on for a synthesis.

Figure 3:
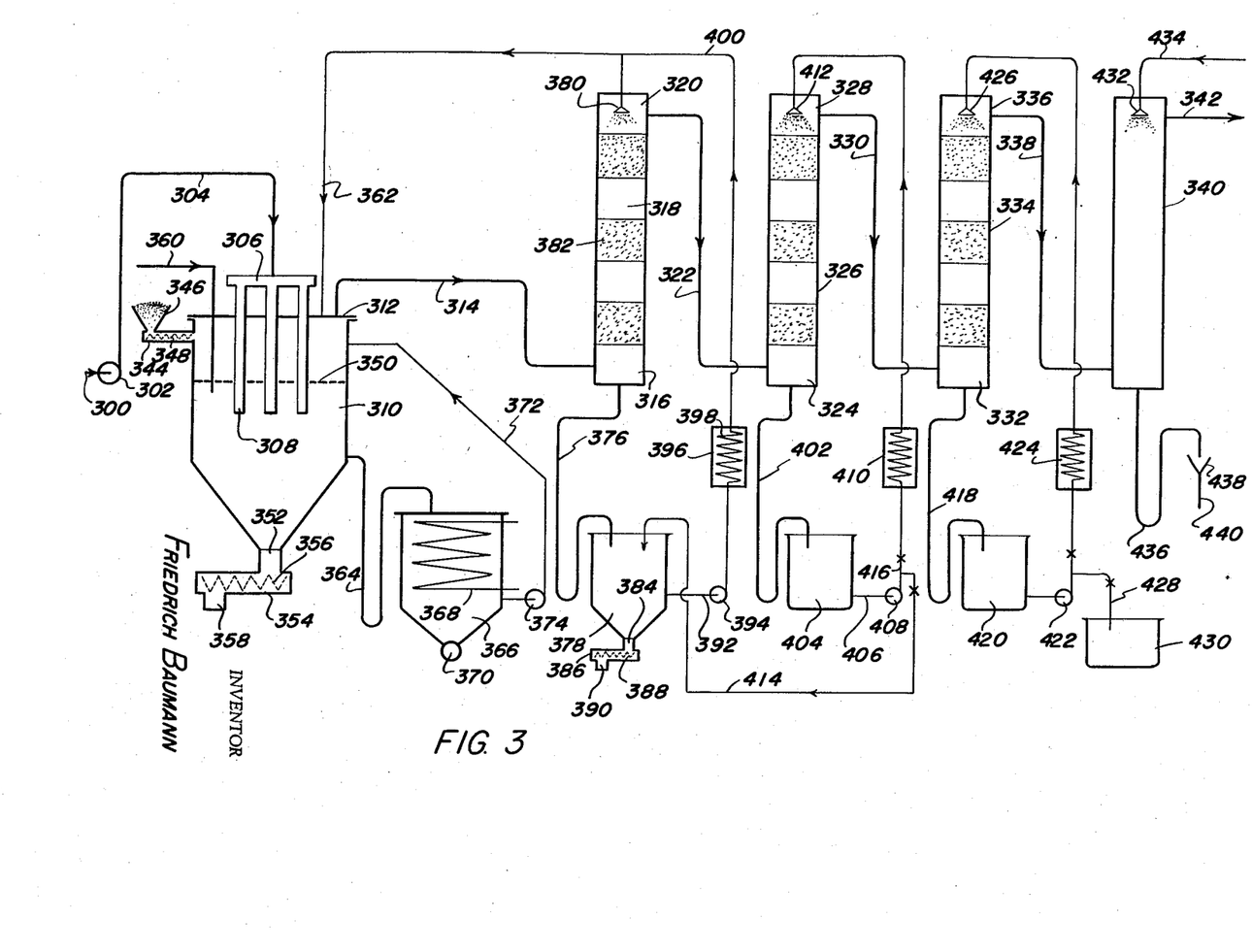
Fig. 3 is a diagram of a device according to the invention intended for separating carbon dioxide from a gas.

Referring now to Fig. 3 of the drawings a device according to the invention for freeing a synthetic gas from carbon dioxide is shown. The synthetic gas enters through a pipe 300 connected to a fan or blower 302 which imparts to the gas the necessary pressure and delivers it to a pipe 304 connected with a head piece 306 communicating with several tubes such as 308 arranged within a vessel 310 the cover 312 of which is connected by a gas pipe 314 with the lowermost compartment 316 of a tower 318 having an uppermost portion 320 connected by a pipe 322 with the lowermost compartment 324 of a second tower 326 having an uppermost compartment 328 connected by a connecting pipe 330 with the lowermost compartment 332 of a tower 334 having an uppermost compartment 336 connected by a pipe 338 with the lower portion of a washing tower 340 from which the gas escapes by a pipe 342 connected to the upper portion thereof.

The upper part of the vessel 310 is connected with a horizontal casing 344 connected with a hopper 346 and containing a conveying screw 348. The hopper 346 is filled with the salt to be charged which is transported by the conveying screw 348 into the vessel 310 in which it drops on a sieve 350 and is dissolved by the washing liquid. The lower portion of the vessel 310 communicates through an opening 352 with a casing 354 containing a conveying screw 356 conveying the formed carbonate, for instance sodium bicarbonate, to an opening 358 in the bottom of the casing 354 by which the carbonate escapes to a collecting device (not shown).

A bent pipe 360 carrying gaseous ammonia or an aqueous solution thereof is arranged in the upper part of the vessel 310. A pipe 362 to be more fully described hereinafter carries washing liquid containing salt to the vessel 310. With the lower part of the vessel 310 a siphon 364 is connected carrying the ammonium salt solution flowing from the vessel 310 to a vessel 366 provided with a cooling element 368 connected to a refrigerating device (not shown) for circulating a refrigerant therethrough. At the bottom of the vessel 366 a discharging device 370 such as a screw discharges the separated ammonium salt. A pipe 372 connects the lower part of the vessel 366 with the upper part of the vessel 310, said pipe being provided with a pump 374 for pumping the washing liquid from the vessel 366 to the vessel 310, where it dissolves freshly charged salt and enters the process again.

The lowermost compartment 316 of the tower 318 is connected with a siphon 376 connecting the compartment 316 with a vessel 378. The pipe 362 returning the salt containing washing liquid is connected with a spraying device 380 arranged in the uppermost compartment 320 of the column 318. The liquid discharged by the spraying device 380 is brought to an intimate contact with the gas passing through the pipe 314 and entering the lowermost compartment 316 of the tower 318 by the pores of the insets such as 382 of the tower 318. In the washing tower or column 318 the gas containing ammonia and carbon dioxide is sprinkled with a diluted salt ammonium or an ammonia solution so as to clean the gas containing ammonia and carbon dioxide still further. The washing liquid passes through the siphon 376 to the vessel 378, the lower portion of which is provided with an opening 384 leading to the interior of a casing 386 housing a conveying screw 388 for the salt formed in the vessel 378, for instance sodium bicarbonate which is conveyed to an exit opening 390. The washing liquid leaves the vessel 378 through a pipe 392 containing a pump 394 and being connected to a cooling chamber 396 in which it forms a coil 398 connected by a pipe 400 with the spraying device 380 and the pipe 362 so as to return the liquid to the vessel 310. It should be noted that the liquid is partly conveyed by the spraying device 380 to the washing column or tower 318 and is partly conveyed by the pipe 362 to the vessel 310 of the saturator where it is used for replenishing the liquid so as to compensate any water losses. The second washing column or tower 326 serves the same purpose as the first washing column or tower 318 with the difference that a salt ammonium or an ammonia solution having a lower concentration as that circulating in the tower 318 circulates in the second column or tower 326, this circulation of the liquid being maintained through a siphon 402 analogous to the siphon 376, a vessel 404 analogous to the vessel 378, a pipe 406 analogous to the pipe 392, a pump 408 analogous to the pump 374, a cooling device 410 analogous to the cooling device 398, and the spraying device 412 analogous to the spraying device 380. A connecting pipe 414 connects the point 416 between the pump 408 and the cooling device 410 with the interior of the vessel 378 so as to replenish the washing liquid in the vessel 378.

If further cleaning stages are required a further cleaning column or tower and further means for circulating a cleaning liquid therethrough may be added to the cleaning towers 318 and 326.

The gas is conveyed by the pipe 330 to the washing column or tower 334 in which the remnants of ammonia are removed by circulating an acid therethrough by means of the siphon 418, the vessel 420, the pump 422, the cooling device 424, and the spraying device 426. The pump 422 conveys the saturated acid through a pipe 428 to a container 430 in which the acid is further processed.

Finally within the column or tower 340 a spraying device 432 connected to a pipe 434 carrying fresh water is arranged, so that the water removes the acid droplets carried along by the gas and leaves through a siphon 436, the water being conveyed to a funnel 438 connected with a drainage pipe 440.

An essential requirement of the devices described hereinabove is the greatest possible saving of acid for the binding of ammonia in the acid column. To this end according to the embodiment shown in Fig. 4 of the drawings the circulating liquid is guided through the washing columns for ammonia and carbon dioxide in such a manner that part of the washing columns are inserted in front of the saturator so that in the outlet of the washing columns a liquid is formed which contains ammonium bicarbonate, said liquid being introduced into the washing columns arranged behind the saturator.

According to the invention the liquid circulating in the columns arranged before the saturator is adjusted so that it has in the outflow a weight ratio of carbon dioxide to ammonium which is larger than 1.29 whereas the liquid within the washing columns arranged behind the saturator has in the outflow a ratio of carbon dioxide to ammonia being smaller than 1.29. The liquid is thus better capable of absorbing the ammonia present in the gas so that a saving of acid is obtained.

Figure 4:
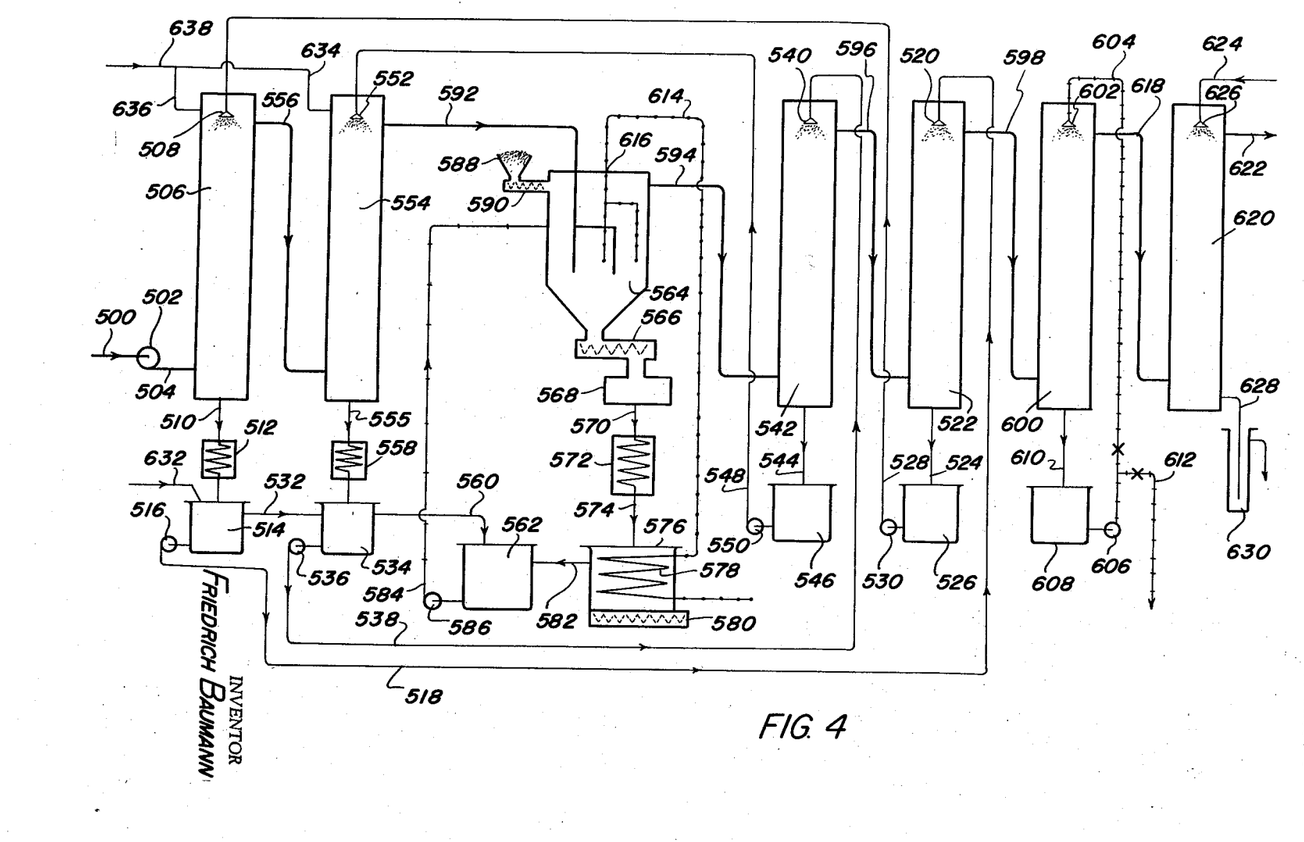
Fig. 4 is a diagram of a modified device for separating carbon dioxide from a gas.

Referring now to Fig. 4 of the drawings in detail, the gas enters the device by a pipe 500 and passes a blower or fan 502 increasing the pressure of the gas and delivering the same through a connecting pipe 504 to the bottom part of a washing tower or column 506 equipped with the spraying device 508. The washing liquid is withdrawn from the column 506 by a pipe 510 connected with a cooler 512 from which the liquid flows into a container 514 from which it is withdrawn by a pump 516 inserted in a pipe 518 connected with a spraying device 520 arranged in the uppermost part of a washing column or tower 522 from which the liquid is withdrawn by a pipe 524 connecting the bottom part of the column 522 with a container 526 connected by a pipe 528 containing a pump 530 with the spraying device 508 of the washing column 506. Thus the liquid describes a closed path between the washing columns 506 and 522.

A pipe 532 connects the upper part of the container 514 with the upper part of a container 534 from which liquid is conveyed over a pump 536 into a pipe 538 connected to a spraying device 540 arranged in the upper part of a column 542 from which liquid is withdrawn through a pipe 544 connected to a container 546 connected by a pipe 548 equipped with a pump 550 to a spraying device 552 arranged in the upper part of a column 554 connected at its lower end with a pipe 555 surrounded by a cooling device 558 and opening into the container 534.

The gas leaves the column 506 by the pipe 556 and enters the washing column 554 at the lower end thereof so that the gas is sprinkled by the spraying device 552 with a somewhat stronger salt ammonium liquid. After passing the cooling device 558 the washing liquid enters the container 534 and is from there pumped together with the liquid flowing through the pipe 532, by the pump 536 into the pipe 538 connected to the spraying device 540 of the column 542. The liquid flowing through the connecting pipe 544 into the container 546 is conveyed by the pump 550 and the connecting pipe 548 to the spraying device 552 arranged within the column 554 and thus is conveyed in a closed circuit. A pipe 560 connects the upper portion of the container 534 with the upper portion of a container 562 so that part of the liquid present in the container 534 is conveyed by the pipe 560 into the container 562 and serves as a supplement to the liquid used in the formation of ammonium bicarbonate.

A saturator 564 similar to the saturator 310 shown in Fig. 3 is equipped with a withdrawing device 566 similar to the withdrawing device 356 disclosed in Fig. 3. The withdrawing device 566 leads the concentrated washing liquid to a device 568 such as a filter, a strainer, or a centrifuge which separates the liquid from the formed carbonate, for instance sodium bicarbonate, which is then conveyed through a connection pipe 570 to a cooler 572 connected by a connecting pipe 574 with a container 576 in which a cooling device 578 carrying a cooling liquid is arranged. In the lower part of the container 576 is a withdrawing device 580 such as a conveying screw arranged and serves for the withdrawing of the separated salt. The liquid freed from sparingly soluble carbonate and partly from the ammonium or alkali salts flows through a pipe 582 from the upper portion of the container 576 to the upper portion of the container 562 from which it is pumped through the pipe 584 provided with a pump 586 to the saturator 564 to which fresh salt is delivered by the hopper 588 and the conveying screw 590. The gas passes after leaving the column 554 through a pipe 592 to the saturator 564 and from there through a pipe 594 to the lower portion of the column 542 the upper portion of which is connected by a gas pipe 596 with the lower portion of the column 522 the upper portion of which is connected by a gas pipe 598 with the lower portion of a column 600 being an analog of the column 334 described hereinbefore in connection with Fig. 3. The column 600 is provided with a spraying device 602 connected by a pipe 604 to a pump 606 connected to a container 608 connected by a pipe 610 to the lower portion of the column 600. A fresh water circulation is maintained through the pump 606, the pipe 604, the spraying device 602, the pipe 610 and the container 608, a pipe 612 branching off for delivering the acidulated water to a tank (not shown) or the like. In order to cool the liquid in the container 576 the cooling device 578 is supplied with liquid ammonia gained by the high pressure synthesis and conveyed through the pipe 614. The gaseous ammonia is added at 616 into the washing process and may be added, if desired, to the washing columns for adjusting the composition of the washing liquids. The washing columns may be filled with wood hurdles, porcelain rings, Glover tubes, or the like (not shown). The gas leaves the column 600 by the pipe 618 connected to the lower portion of a final column 620 from which the gas is conveyed by the pipe 622. Fresh water is conveyed by a pipe 624 to a spraying device 626 arranged at the top part of the column 620 the lower part of which is connected by a pipe 628 with an overflow device 630 for fresh water. The container 514 is connected with a pipe 632 through which water is conveyed for equalizing the water losses occurring at the formation of the salt in the vessel 514. The pipe 632 leads condensed or pure water into the vessel 514. Furthermore, the upper portions of the washing columns 506 and 554 are connected, respectively, by pipes 636 and 634 with a pipe 638 allowing to convey, if desired, ammonia or aqueous ammonia to the columns 506 and 554.

The number of the washing columns depends in general on the magnitude of the carbon dioxide content of the synthetic gas and on the desired purity of the final gases. The concentration of the washing liquid is adjusted in such a manner that it increases in direction to the saturator 564 for the columns such as 506 and 554 arranged in front of the saturator 564, and decreases in the columns such as 542, 522, and 600, arranged behind the saturator 564.

In this way it is accomplished to obtain a synthetic gas satisfying the demands for separation from carbon dioxide.

In case that hydrogen sulphide and carbon dioxide are to be removed at the same time from the synthetic gases the blower such as 104 or 202 is connected at the entry of the plant for removing the hydrogen sulphide which is in turn connected to the plant for removing carbon dioxide, the blowers 302 and 502 being omitted in this case.

Figure 5:
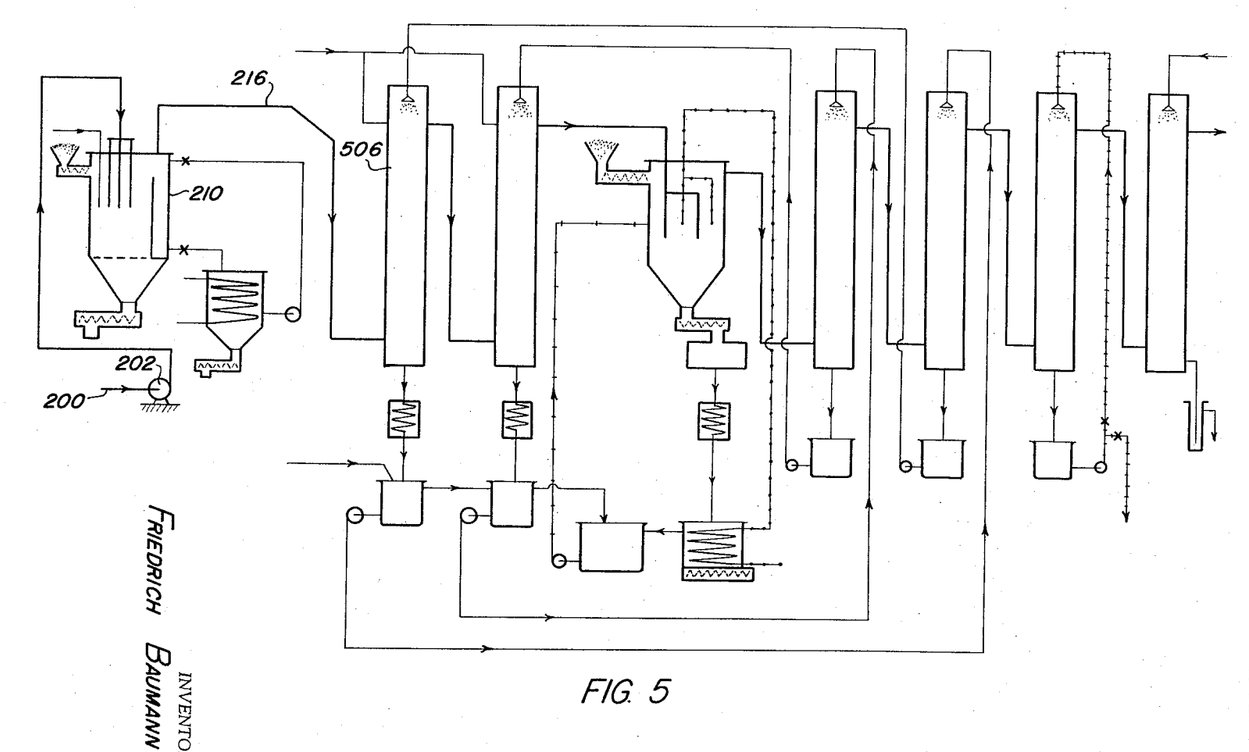
Fig. 5 is a diagram of a device for separating hydrogen sulphide and carbon dioxide from a gas.

Such a device is shown in Fig. 5 which shows a device for separating hydrogen sulphide as shown in Fig. 2 in series with a device for separating carbon dioxide as shown in Fig. 4. In operation the gas enters through the pipe 200 and passes through the blower 202 followed by the vessel 210 the device for separating hydrogen sulphide. The pipe 216 thereof leads directly, that is under omission of any blowing device such as 502, into the washing tower 506 of the device for separating the carbon dioxide shown in Fig. 4. The remaining parts correspond, respectively, exactly to Figs. 2 and 4 and thus are not described in detail at this place of the description, reference being made to the detailed description thereof in connection with Figs. 2 and 4.

The conditions of the liquid circulating in the columns and the saturators are sufficiently known in the art from the process of separation of carbon dioxide by means of ammonia and by the experiences which have been gained by the Solvay ammonia soda process so that a more detailed description thereof appears unnecessary.

The degree of purity from the carbon dioxide of the final gas which is obtainable by the method according to the invention, depends on the number of columns, the given carbon dioxide contant in the crude gas, the admission of liquid to the gas to be cleaned, the gas pressure, and the temperature of the circulating liquids.

The process and the device described hereinbefore are particularly suitable for a large scale synthesis of ammonia, gasoline, and alcohols. These syntheses starting from a common basis, namely the carbon and/or the water gas produced therefrom, are mostly carried out simultaneously. As well for the carbon dioxide present in the synthetic gas and amounting to 27% before the conversion and up to 45% after the conversion of the carbon monoxide, as well as for the ammonia produced in the subsequent synthesis the best possible use is made by the process according to the present invention. Owing to its adaptability to the various salts it furnishes in the most inexpensive manner fundamental substances being in great demand such as soda, sodium bicarbonate, and fertilizers such as ammonium chloride, ammonium sulphate, and ammonium nitrate. Furthermore, it brings an important simplification of the manufacturing process, an increase in capacity, and a decrease of the losses in gas. Owing to these advantages the produced soda is gained in large quantities in an economical manner. For instance, a water gas plant of a gas production amounting to 100,000 cubic meters per hour is in a position to supply on an average 800,000 tons per year of soda as a by-product.

I have described hereinabove preferred embodiments of the process and plants for freeing a synthetic gas from hydrogen sulphide and/or carbon dioxide. However, I wish it to be understood that various modifications, substitutions of equivalents, and changes may be made without departing from the gist and scope of my invention.

I claim:

1. A process of removing $CO_2$ from a gas stream containing the same and having a concentration of $CO_2$ of at least 25% which comprises conducting said gas stream into a reaction zone, contacting said gas stream in said reaction zone with an aqueous solution containing an alkali and an inorganic salt which reacts with $CO_2$ and said alkali to form a compound which is sparingly soluble in water and precipitates, separating the precipitate that forms and removing the effluent gas stream from said reaction zone, said alkali being selected from the group consisting of sodium hydroxide, potassium hydroxide and ammonium hydroxide.

2. A method according to claim 1 wherein said alkali is ammonium hydroxide.

3. A process for removing $CO_2$ from a gas stream having a concentration of $CO_2$ of at least 25% which comprises introducing said $CO_2$ containing gas into a reaction zone, maintaining aqueous solution of an alkali and an inorganic salt above the point of introduction of said gas stream, causing said gas stream to flow upwardly in contact with said alkali and said salt in said reaction zone whereby a reaction is caused to take place forming precipitates, removing effluent gases from said reaction zone and separating precipitates forming in said aqueous solution, said alkali being selected from the group consisting of sodium hydroxide, potassium hydroxide, and ammonium hydroxide, said salt being one which forms a crystalline compound on reaction with $CO_2$ and said alkali.

4. A process for removing $CO_2$ from a gas stream having a concentration of $CO_2$ of at least 25% which comprises introducing said $CO_2$ containing gas into a reaction zone, maintaining aqueous solution of an alkali and an inorganic salt above the point of introduction of said gas stream, said alkali being selected from the class consisting of sodium hydroxide, potassium hydroxide and ammonium hydroxide, said salt being one that will react with said alkali and $CO_2$ to form a compound that is sparingly soluble in water and precipitates and another that is crystallizable from said aqueous solution, causing said gas stream to flow upwardly in contact with said alkali and said salt in said reaction zone whereby a reaction is caused to take place forming in said aqueous solution said sparingly water soluble compound and said crystallizable compound, separating the effluent gases from said reaction zone, separating said sparingly water soluble compound from said aqueous solution, also crystallizing said crystallizable compound from said aqueous solution and recycling the remaining liquor to said reaction zone.

5. A process according to claim 4 wherein said alkali is ammonium hydroxide and said salt is sodium nitrate.

6. A process according to claim 5 wherein said effluent gases are further washed with acid to remove remaining traces of ammonia.

7. A process according to claim 6 including the additional step of water washing the effluent gas.

8. A process for removing $CO_2$ and $H_2S$ from a gas stream containing the same and having a concentration of $CO_2$ of at least 25% which comprises conducting said gas stream into a first reaction zone, contacting said gas stream in said reaction zone with an aqueous solution containing an alkali and a first inorganic salt, said alkali being selected from the group consisting of sodium hydroxide, potassium hydroxide and ammonium hydroxide, said first salt being one which will react with $H_2S$ to form a compound which is sparingly soluble in water, whereby a reaction takes place in said first reaction zone forming a precipitate of a sparingly soluble sulfide, removing the effluent gases from said first reaction zone, introducing said effluent gases into a second reaction zone, contacting said effluent gases in said second reaction zone with an aqueous solution containing an alkali and a second inorganic salt which reacts with $CO_2$ and said alkali to form a compound which is sparingly soluble in water whereby a reaction takes place forming from said $CO_2$, said alkali and said second salt a sparingly water soluble compound, and conducting the effluent gases out of the second reaction zone.

References Cited in the file of this patent

UNITED STATES PATENTS

| | | |
|---|---|---|
| 623,893 | Fairley | Apr. 25, 1899 |
| 839,741 | Feld | Dec. 25, 1906 |
| 1,053,456 | Uhde | Feb. 18, 1913 |
| 1,349,750 | Ciselet et al. | Aug. 17, 1920 |
| 1,897,725 | Gaus et al. | Feb. 14, 1933 |
| 1,931,817 | Hogan et al. | Oct. 24, 1933 |
| 2,028,124 | Shaw | Jan. 14, 1936 |
| 2,142,406 | Nonhebel et al. | Jan. 3, 1939 |
| 2,164,194 | Millar et al. | June 27, 1939 |